United States Patent
Yeh et al.

(10) Patent No.: US 6,970,471 B1
(45) Date of Patent: Nov. 29, 2005

(54) COMMUNICATING USING IP ADDRESSING FOR REDUNDANT TELEPHONY MODULES

(75) Inventors: Wei Jen Yeh, Cary, NC (US); Catherine L. Louis, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 717 days.

(21) Appl. No.: 09/670,747

(22) Filed: Sep. 27, 2000

(51) Int. Cl.[7] .................. H04L 12/66; H04L 12/28; G01R 31/08

(52) U.S. Cl. ................ 370/395.52; 370/219; 370/352; 370/389

(58) Field of Search ................ 370/217–220, 370/225, 227, 228, 352, 353, 356, 389, 400, 370/401, 433

(56) References Cited

U.S. PATENT DOCUMENTS

| | | | |
|---|---|---|---|
| 5,796,742 A * | 8/1998 | Klotzbach et al. | 370/466 |
| 5,907,610 A * | 5/1999 | Onweller | 379/242 |
| 6,356,622 B1 * | 3/2002 | Hassell et al. | 379/1.01 |
| 6,366,561 B1 * | 4/2002 | Bender | 370/238 |
| 6,618,377 B1 * | 9/2003 | Miriyala | 370/395.1 |
| 6,640,314 B1 * | 10/2003 | Lelaure et al. | 714/11 |

* cited by examiner

*Primary Examiner*—Hanh Nguyen
(74) *Attorney, Agent, or Firm*—Withrow & Terranova, PLLC

(57) ABSTRACT

The present invention provides for efficient and reliable IP addressing in redundant telephony modules where an active one of the redundant modules must communicate using a common IP address. An addressing methodology is provided wherein an active module in a node assumes and uses an active IP address for the node. The inactive module may assume and use an inactive IP address for communication directed to the inactive module within the node.

21 Claims, 7 Drawing Sheets

| IP ADDRESS | USE | XPM NODE LOGICAL/PHYSICAL |
|---|---|---|
| N | ACTIVE XPM | LOGICAL (DYNAMIC) |
| N + 1 | INACTIVE XPM | LOGICAL (DYNAMIC) |
| N + 2 | UNIT 0 (XPM0) | PHYSICAL (STATIC) |
| N + 3 | UNIT 1 (XPM1) | PHYSICAL (STATIC) |

*FIG. 5*

COMMUNICATING USING IP ADDRESSING FOR REDUNDANT TELEPHONY MODULES

FIELD OF THE INVENTION

The present invention relates to telephony devices, and in particular, allowing telephony devices requiring redundant systems to operate effectively in an Internet Protocol network environment.

BACKGROUND OF THE INVENTION

Given the mandatory reliability for telephony devices providing the infrastructure for the public switched telephony network (PSTN) and packet-switched networks, many telephony devices for interfaces, switching, and routing data or calls require a backup in case of failures or maintenance affecting operation. As such, many telephony functions require redundant devices wherein one device is active when the other device is inactive. When the active device fails or requires maintenance, the inactive device becomes active and provides the functionality for the now inactive device.

Traditionally, signaling and control messages are communicated between the redundant devices and with other devices in the telephony network using proprietary protocols over direct, physical connections. Unfortunately, these proprietary protocols and physical connections limit upgradability and the manner in which these devices interact with one another. Product and system evolution is hindered by the existing infrastructure and protocols.

Given the extensive use of the Internet Protocol (IP), and its uniform and network-independent addressing, providing communications between telephony devices for messaging and signaling is preferable. However, a major hurdle in the conversion to IP-based communications is the difficulty in maintaining IP addresses for the redundant devices used to form a telephony node. For example, when two redundant devices are used to form primary and backup devices for a given telephony node, only one device will be active at a given time.

The active device must appear to the rest of the network as the node and be associated with a single IP address for that node. When the primary device fails, the backup device must take control and appear to the network as the node with that node's IP address. This requires the active device, regardless of which device is active, to appear as the node and communicate using a single IP address when active. Although the rest of the network needs to communicate with the node, it is often necessary to communicate with both devices within the node for status inquiries and maintenance, regardless of activity.

As such, there is a need for an efficient and reliable way to provide IP addressing in a manner allowing redundant devices to communicate using a single IP address independent of the active device. There is a further need to maintain the ability to communicate with these devices regardless of their activity.

SUMMARY OF THE INVENTION

The present invention provides for efficient and reliable IP addressing in redundant telephony modules where an active one of the redundant modules must communicate using a common IP address. An addressing methodology is provided wherein an active module in a node assumes and uses an active IP address for the node. The inactive module may assume and use an inactive IP address for communication directed to the inactive module within the node.

Devices on a local area network communicating with the node using hardware addresses are informed of changes in association with the active, and preferably, inactive IP addresses, with the given hardware addresses when the modules change activity. Preferably, the modules use the address resolution protocol (ARP) to trigger devices on the local area network to update their ARP caches when modules switch control or receive errant messages. Further, the addressing scheme preferably provides a static address for each module, regardless of activity, to allow other IP devices to communicate with the individual modules whether in an active or inactive mode.

The invention allows telephony modules of various types and functions to communicate with each other and with hosts on local and remote networks using IP addressing. Telephony nodes made of redundant devices may efficiently switch activity without requiring changes in applications on local and remote hosts.

Other advantages of the present invention will become apparent to those skilled in the art from the following description wherein there are shown and described preferred embodiments of this invention. As will be realized, the invention is capable of other different aspects, all without departing from the invention. Accordingly, the drawings and description will be regarded as illustrative in nature and not as restrictive.

BRIEF DESCRIPTION OF THE DRAWING FIGURES

The accompanying drawings incorporated in and forming a part of the specification illustrate several aspects of the present invention, and together with the description serve to explain the principals of the present invention.

FIG. 5 is a table outlining an IP addressing methodology according to a preferred embodiment of the present invention.

Reference will now be made in detail to preferred embodiments of the present invention, examples of which are illustrated in the accompanying drawings, wherein like numerals indicate the same elements throughout the views.

DETAILED DESCRIPTION OF THE PREFERRED EMBODIMENTS

The present invention provides unique system architecture for allowing redundant telephony equipment to effectively communicate over an Internet Protocol network, or the like. The preferred embodiment of the invention specifically relates to allowing redundant communication nodes associated with a telephony switching device to communicate over a network using the Internet Protocol (IP) and related addressing. In an effort to provide the best mode of making and implementing the invention in addition to providing an enabling disclosure, this description focuses on a particular telephony module referred to as an extended peripheral module or XPM. The inventive aspects incorporated in the described XPM are readily transportable to any number of redundantly operating telephony devices. Those skilled in the art will recognize the utility and applicability of the concepts described herein to other redundant telephony devices in an IP environment.

Figure 1:
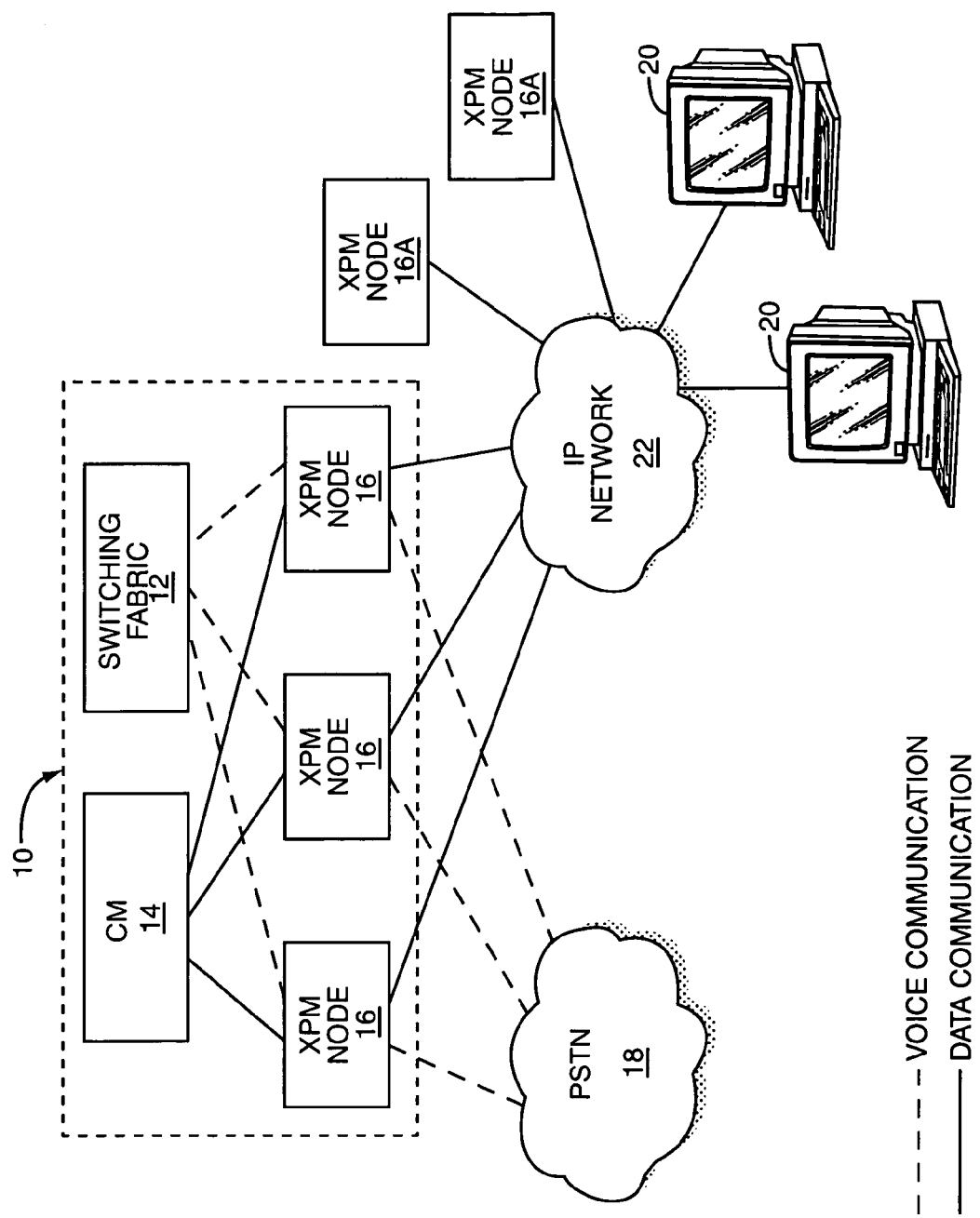
FIG. 1 is a schematic representation of a switching system and related environment according to a preferred embodiment of the present invention.

Turning now to FIG. 1, a telephony switching environment is shown having a telephony switching system 10, such as a digital multiplex switch, having a time division multiplexing (TDM) switching fabric 12, a computation module (CM) 14 and several extended peripheral module (XPM) nodes 16. The switching system 10 is configured to provide call processing and switching functions for the public switched telephone network (PSTN) 18. Preferably, the PSTN 18 includes numerous line concentrating devices (not shown) that connect to customer phone lines and trunks. The line concentrating devices provide TDM traffic to the switching system 10 via the XPM nodes 16.

The XPM nodes 16 cooperate with the CM 14 to provide call processing for call routing and other features provided by the telephony network. Each XPM node 16, typically under the control of the CM 14, directs the TDM traffic to line concentration devices associated with that particular XPM node 16 or on to the switching fabric 12 for delivery to other parts of the PSTN 18. During operation, calls coming in from customers are provided to the XPM node 16 wherein the CM 14 and XPM node 16 will monitor the dialed digits, determine how the call is routed, and provide any necessary features associated with the call.

To provide the various types of call processing, the XPM nodes 16 may communicate with other XPM nodes 16 directly associated with the switching fabric 12 as well as remote XPM nodes 16A, or other host 20 over an IP network 22. The XPM nodes 16, 16A may take on any number of telephony devices providing various telephony applications. For example, the XPM nodes 16, 16A may make up part of the signaling system 7 (SS7) or integrated service user part (ISUP) signaling. Alternatively, the hosts 20 may be operator terminals providing various operator services in association with the telephony switching system 10. In essence, the CM 14 and associated XPM nodes 16 facilitate call processing and services for data and voice using the open architecture of the Internet Protocol.

Figure 2:
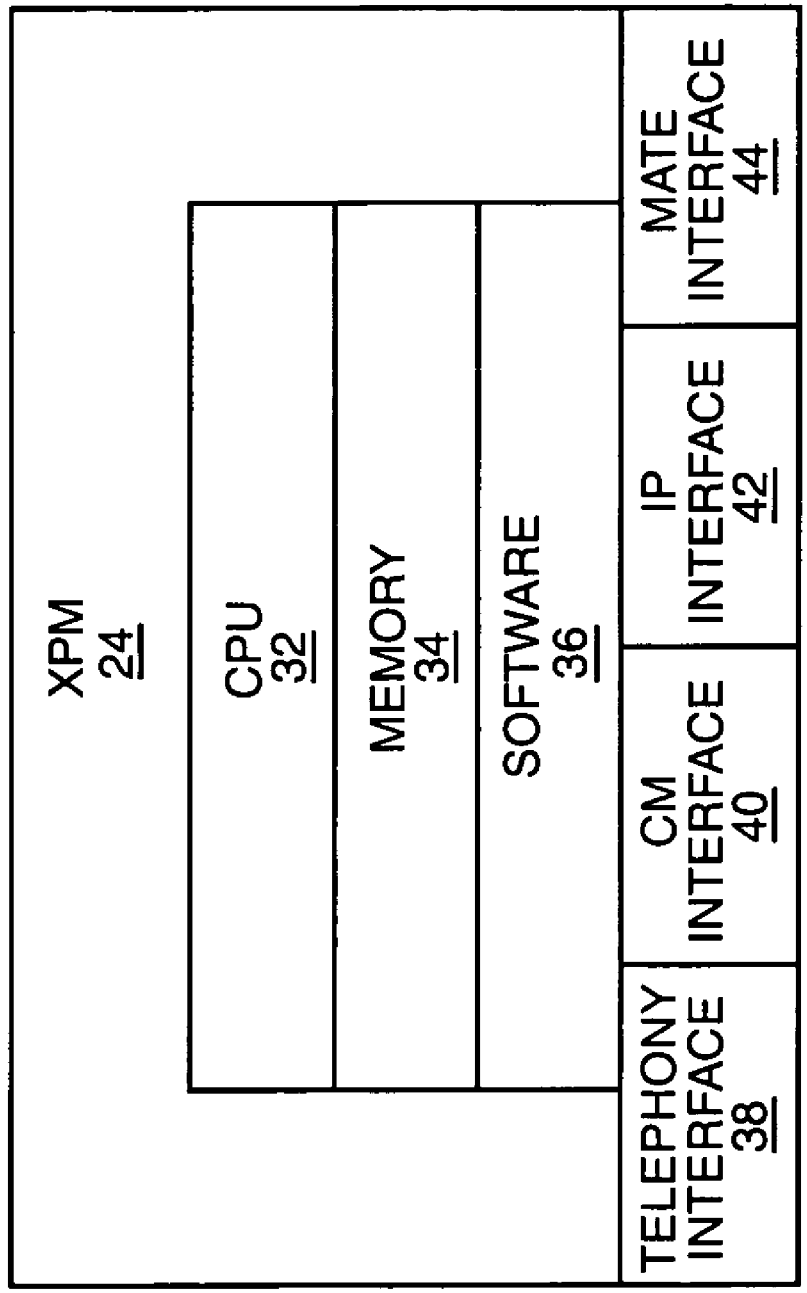
FIG. 2 is a block representation of a preferred peripheral module constructed according to a preferred embodiment of the present invention.

Each XPM node 16 is made up of two XPMs 24. As shown in FIG. 2, each XPM 24 preferably includes a central processing unit (CPU) 32 associated with memory 34 having the requisite software 36 for operation. The XPMs 24 preferably include a line or trunk telephony interface 38 capable of handling TDM traffic of the PSTN 18. A CM interface 40 is provided for communicating with the CM 14. In the preferred embodiment, the CM interface 40 provides messaging between the XPM 24 and CM 14 using proprietary signaling incorporating Nortel's DS30 or DS512 protocols. Signaling between the CM 14 and XPMs 24 may also be provided over any proprietary or open architecture network, including the Internet. The XPMs 24 will also include an IP interface 42, preferably coupled to a local area network (LAN), such as an Ethernet network. A mate device interface 44 allows the redundant XPMs 24 in a given XPM node 16 to communicate with each other. Although these XPMs 24 may communicate with each other in a variety of ways, the mate device interface 44 allows each XPM 24 to monitor the status or failure of the mate to take over activity as necessary.

Figure 3:
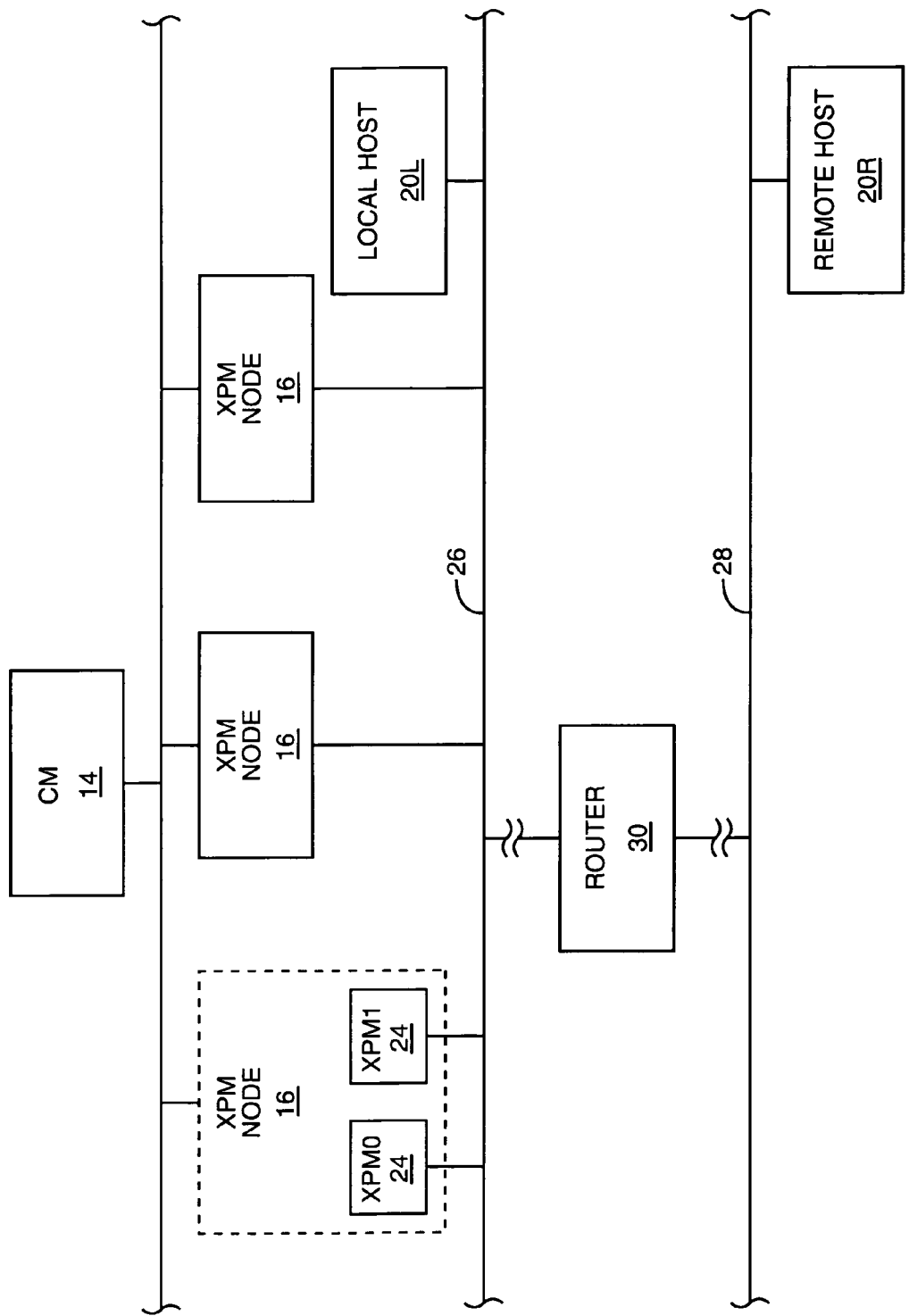
FIG. 3 is a network diagram of a network containing a peripheral device according to a preferred embodiment of the present invention.

As depicted in FIG. 3, each XPM node 16 contains two XPMs 24, identified as XPM0 and XPM1. Each of the XPM nodes 16 associated with a given CM 14 may be connected to one or more LANs 26, which may include one or more local hosts 20L. Each of the XPMs 24 making up an XPM node 16 is coupled to the LAN 26 and is given a dedicated hardware address, as with all other devices connected to the LAN 26. The XPMs 24 may communicate with other XPM nodes 16 and local host 20L on the LAN 26 as well as communicate with other devices, such as remote host 20R on a second LAN 28 over an IP network including one or more routers 30 in traditional fashion using the TCP/IP protocol suite.

During operation, each XPM node 16 should appear as a single XPM 24 to local and remote devices communicating with the XPM nodes 16 to carry out traditional call processing and related activities. The reason that each XPM node 16 includes two XPMs 24 is to provide the required redundancy in critical telephony equipment. As such, one XPM 24 is always available if any given XPM 24 fails or requires maintenance that inhibits operation.

Traditionally, XPM nodes 16 communicated with one another over proprietary networks, reducing the flexibility of the devices and limiting communications to those devices coupled to the proprietary network. Further, the XPM nodes 16 were relegated to communicating with one another through the CM 14, which significantly reduced the efficiency and capacity of the CM 14. In an effort to improve compatibility of the XPM nodes 16 with standard IP networking technology, the XPM nodes 16 of the present invention are configured to communicate with each other and other telephony nodes and devices using the Internet Protocol.

Unfortunately, the redundant nature of the XPMs 24 making up each XPM node 16 causes addressing problems in an IP network. During operation, one XPM 24 will be active while its mate is inactive; however, a given XPM node 16 must have the same IP address regardless of which XPM 24 is active. Further, each XPM 24 must be addressable, regardless of activity, for maintenance and related communications. To complicate matters further, there are situations where the inactive XPM 24, which can be either one of the XPMs 24 at any given time, must be addressable. Given these addressing needs, the following are preferable:

1) the "active" XPM 24 has a unique IP address;
2) the "inactive" XPM 24 has a unique IP address; and
3) each XPM 24 has a unique IP address regardless of activity.

Any time one XPM 24 within an XPM node 16 is active, the other XPM 24 is inactive. The active XPM 24 will represent the XPM node 16. Unfortunately, when the active XPM 24 fails, the inactive XPM 24 must become active and assume responsibility for the XPM node 16. This responsibility requires switching the IP address for the active and inactive XPMs 24.

With the present invention, the local and remote hosts are configured to have the IP address for the active XPM 24. However, those skilled in the art will recognize that each device connected to a local area network will have a physical, hardware address in addition to the IP address. Communications along the network use the physical addresses associated with known IP addresses of these devices. As such, when there is a switch of the active XPM 24 in an XPM node 16, the IP addresses for the active unit and the inactive unit will switch, but the physical address for the XPMs 24 will not. The nature of the Internet Protocol allows devices to communicate across networks without knowledge of the specific, physical address of the receiving device when a message is sent. However, for ultimate delivery of the message, a router or like device must associate a physical hardware address on the LAN 26 with the destination device's IP address, if the message doesn't already include the destinations physical address.

The problem is that IP addresses only make sense to the TCP/IP protocol suite. A datalink for an Ethernet or like network has a dedicated addressing scheme to which any network layer using the datalink must conform. For example, when an Ethernet frame is sent from a router or host to another host on a LAN, typically, a 48-bit Ethernet address determines for which device the frame is destined. The device driver software never looks at the destination IP address in the IP datagram carrying the message. Address resolution is required to map the 32-bit IP address to the destination host's physical address on the LAN. The address resolution protocol (ARP) provides dynamic mapping from an IP address to a corresponding hardware address. Typically, this dynamic mapping occurs automatically outside of the realm of the application user or system administrator. The Internet Engineering Task Force's RFC 826 provides additional information on ARP request and is incorporated herein by reference.

Figure 4:
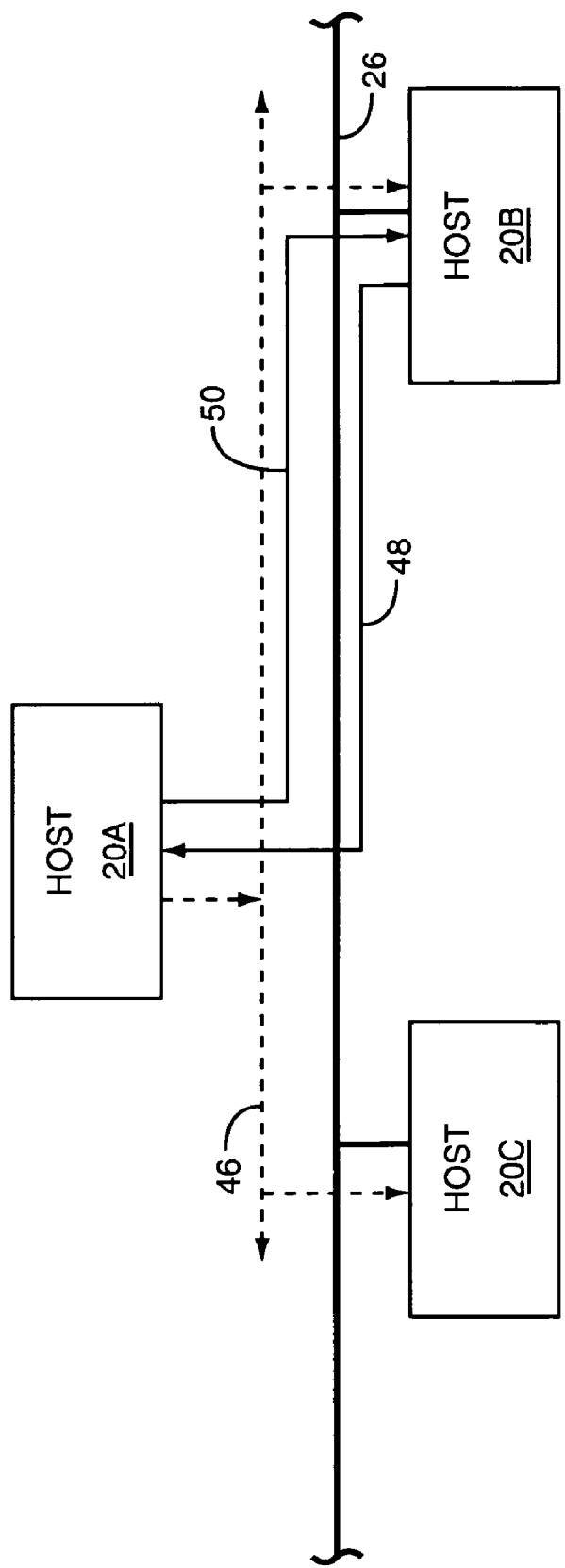
FIG. 4 is a diagram of a local area network depicting the flow of address resolution protocol.

ARP is best understood by example and in conjunction with FIG. 4. FIG. 4 depicts three hosts, 20A, 20B, and 20C coupled to a LAN 26. Assume that host 20A is running an application ready to send a message to a similar application running on host 20B. Typically, the application will provide a client, which calls a function to convert the destination host name into a 32-bit IP address. If TCP is used, the client will ask its TCP application to establish a connection with the identified IP address. The TCP application sends a connection request to host 20B by sending an IP datagram to its IP address. If the host 20B is on a locally attached network as depicted, the IP datagram can be sent directly to that host. If the destination host is on a remote network, the IP routing function determines the Internet address of the locally attached next-hop router to send the IP datagram.

In either case, the IP datagram is sent to a host or router on a locally attached network. If the LAN is an Ethernet, the sending host 20A must convert the 32-bit IP address into a 48-bit Ethernet address. In essence, the logical IP address is translated into its corresponding physical hardware address. This translation is typically provided by ARP. ARP is especially useful for networks capable of broadcasting messages to each of the hosts or routers on the network. In operation, ARP broadcasts an Ethernet frame called an ARP request 46 to every host (including routers) on the LAN. This broadcast is shown with dashed lines extending from host 20A along the LAN 26 to hosts 20B and 20C. The ARP request contains the IP address of the destination host 20B.

All of the hosts and routers on the LAN 26 will receive the request 46, and will compare the IP address and the request with their own IP addresses. Only the host with the matching IP address will respond. The response will include the associated hardware address for the host having the matching IP address. In this example, the ARP layer in host 20B receives the broadcast 46, recognizes that the sender is asking for its hardware address, and replies with an ARP reply 48. This reply contains the IP address and the corresponding hardware address for host 20B. The ARP reply is received by the host 20A, and the IP datagram 50 is sent host 20B.

The primary principles behind ARP are that a network interface has a hardware address and frames exchanged at the hardware level must be addressed to a correct interface. Since IP works with its own addressing, knowing a host IP address isn't sufficient to send a frame to that host. Ultimately, the device responsible for sending a message to a host on it's LAN must know the destination's hardware address. The function of ARP is to dynamically map IP addresses and hardware addresses. ARP is only necessary when the device in the local network sending a message to the destination host doesn't have the hardware address or the datagram doesn't include the hardware address. Preferably, the devices on a LAN have an ARP cache that maintains recent mappings between Internet addresses and hardware addresses for devices connected to the LAN.

A version of ARP is called Gratuitous ARP (GARP). Traditionally, GARP is used when a host sends an ARP request looking for its own hardware address. An example GARP request would be "arp-who-has 150.151.10.42. tell 150.151.10.42." Notably, the host is sending a broadcast to all devices on the LAN requesting a response for any device having the host IP address. As with any ARP request, GARP is usually used to examine and manipulate the ARP cache of devices on the LAN.

The present invention takes advantage of ARP, or like address resolution schemes, in combination with a special addressing system for redundant telephony devices, such as the XPMs 24. The table of FIG. 5 depicts an exemplary IP addressing scheme for the XPMs 24, XPM0 and XPM1, respectively, of the XPM node 16. As noted above, XPM0 or XPM1 will be active when the other is inactive. As such, a logical IP address is associated with the currently active XPM 24 (N) as well as the currently inactive XPM 24 (N+1). When the active XPM 24 switches to inactive and the inactive XPM 24 switches to active, the logical IP addresses will change their association with the particular XPMs 24. As shown in FIG. 5, a consecutive IP addressing scheme is provided where IP address N represents the active XPM 24 and IP address N+1 is associated with the inactive XPM 24. Thus, if XPM0 is active and XPM1 is inactive, a switch of activity (SWACT) will cause XPM0 to become inactive and XPM1 to become active. Concurrently with the SWACT, the active IP address N will be associated with XPM1 and the inactive IP address N+1 will be associated with XPM0 until another SWACT occurs.

In certain circumstances, communication with a specific XPM 24 is necessary regardless of whether it is active or inactive. As such, the addressing scheme provides static IP addresses for each XPM 24 that do not change regardless of activity. Continuing with the addressing scheme depicted in FIG. 5, XPM0 is permanently assigned IP address N+2. Similarly, XPM1 is permanently assigned IP address N+3. These addresses are associated with a particular XPM 24 to allow direct communication, regardless of activity. Preferably, each XPM node 16 is associated with four IP addresses. The IP addresses do not have to be consecutive, as depicted in FIG. 5, as long as the devices communicating with any XPM node 16 understand the addressing scheme.

Figures 6A, 6B:
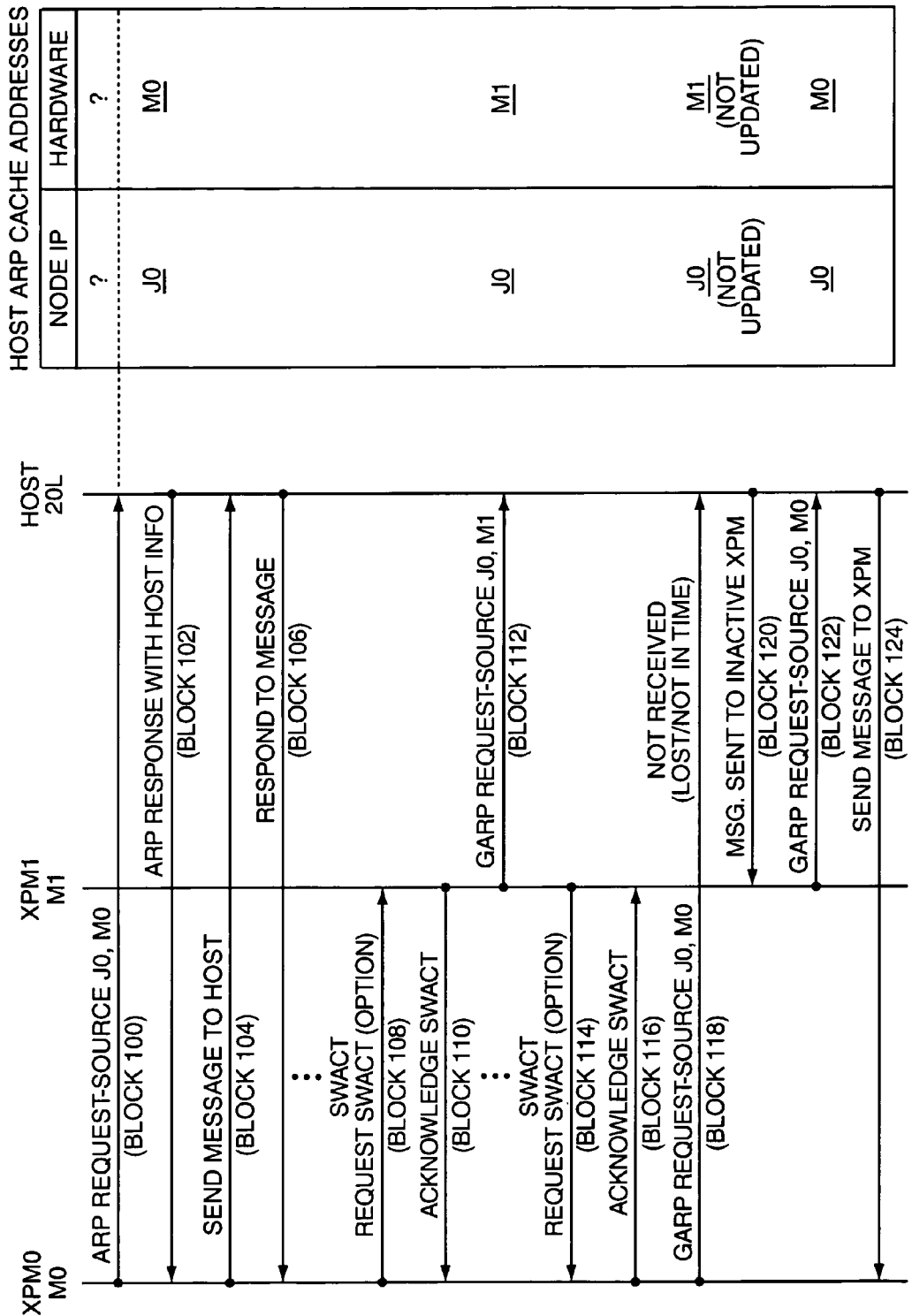
FIG. 6A is a flow diagram outlining exemplary address resolution messaging according to a preferred embodiment of the present invention.
FIG. 6B is a table outlining addresses in ARP cache for network devices according to the flow diagram of FIG. 6A.

In operation, the present invention uses ARP and GARP requests in a strategic fashion to ensure that devices on the LAN 26 associate the proper IP address with an XPM's hardware address, even as the IP address for the active and inactive XPMs 24 periodically change. FIG. 6A outlines an exemplary flow for several exemplary messaging and SWACT sequences between XPM0, XPM1 and a host 20L on a local network. FIG. 6B depicts the status of the ARP cache for the hosts and routers on the LAN 26. Importantly, the ARP cache for host 20L will be the same as that of the router 30 or like device on the LAN 26. Assume that XPM0 is active and has a hardware address of M0. Further assume that the active IP address is J0 and that the hardware address for XPM1 is M1.

If CM 14 desires to send a message to host 20L, an appropriate command is preferably sent from the CM 14 to the active XPM0 via the CM interface 40. The active XPM 24 likely has the IP address for the host 20L available, but may not have the hardware address for host 20L. If this is the case, an ARP request is broadcast over the LAN 26 identifying the source IP address J0 and hardware address M0 (BLOCK 100). The ARP request will also include the destination IP address for the host 20L. The host 20L will respond to the ARP request with the corresponding hardware address information (BLOCK 102). The host 20L will update its ARP cache by associating the IP address J0 with the hardware address M0, as shown in the corresponding table in FIG. 6B. At this point, the XPM0 will send the message, which was directed by the CM 14 to the host 20L over the LAN 26 using the hardware address for the host 20L (BLOCK 104). The host 20L will respond to the message by sending a response to XPM0 using the hardware address M0, which is associated with the IP address J0 (BLOCK 106).

As noted, the host 20L is associating the IP address J0 and the associated hardware address M0 with the IP address of the active XPM 24 (XPM0). Assume that a SWACT occurs wherein XPM0 becomes inactive and XPM1 becomes active. Although the XPMs 24 in a given XPM node 16 may be hardwired to communicate the current status or SWACT occurrences, the active unit may optionally request a SWACT by sending an appropriate message requesting the inactive unit to become active. In the present example, XPM0 may send a SWACT request to XPM1 (BLOCK 108), which will respond with an acknowledgment (BLOCK 110). At this point, the ARP caches for the LAN 26 devices are inaccurately associating IP address J0 with the hardware address M0, associated with the now inactive XPM0.

When a SWACT occurs, the newly active XPM 24, which is XPM1 in the current example, preferably broadcasts a GARP request over the LAN 26 using the IP address J0, (which represents the currently active XPM1) and hardware address M1 (BLOCK 112). The active XPM1 is configured to take over the active IP address J0 when a SWACT occurs. Further, either XPM0 or XPM1 will respond to their dedicated unit addresses, which remain static. Thus, at any given time, each XPM will take on two IP addresses, one for activity, and one for the particular unit.

Notably, the GARP request is associating the active IP address with a different hardware address, which is going to be received by all of the devices on the LAN 26, including the host 20L. All of these devices will update their ARP caches to associate the active IP address J0 with the newly active XPM1 hardware address, M1. At this point, the host 20L may communicate with the active XPM 24 (XPM1) using IP address J0, which is now properly associated with hardware address M1.

Let's now assume that another SWACT occurs where XPM1 issues a SWACT request to XPM0 (BLOCK 114), and XPM0 acknowledges the SWACT (BLOCK 116) and takes over activity. Now, the IP address J0 identifying the active XPM 24 should be associated with XPM0. XPM1, the inactive XPM 24, will take over an address representing the inactive unit. As described above, the active XPM 24, which is XPM0, will send a GARP request identifying the IP address J0 and the new hardware address M0 for XPM0 (BLOCK 118).

As with many packet- or frame-based delivery systems, there is a possibility that the host 20L did not receive the GARP request at all or did not receive the GARP request in time before initiating a message back to the currently inactive XPM1. As such, the ARP cache for the host 20L mistakenly identifies hardware address M1 (associated with XPM1) with the active IP address J0. Thus, a message sent by host 20L to the active XPM 24 will be sent to XPM1, which has the hardware address M1 (BLOCK 120). If an inactive XPM 24 receives a message directed to an active XPM 24, the inactive XPM 24 will immediately broadcast a GARP request identifying the active unit's IP address and hardware address, which in the current example are J0 and M0, respectively (BLOCK 122). Assuming the host 20L receives the broadcast, the associated ARP cache is updated to associate hardware address M0 with IP address J0. As such, the next message sent by host 20L to the XPM node 16 will be directed to active XPM0 (BLOCK 124).

As can be seen from the above, the newly active XPMs 24 will send out a GARP request identifying the associated hardware address along with the active IP address. If an inactive unit receives a message directed to an active unit based on an incorrect hardware address, the inactive unit will initiate a GARP request identifying the IP address and hardware address for the active XPM 24. Similarly, the active unit may also send out the GARP message when it receives a packet directed to the inactive unit. GARP requests may be sent for address resolution when the XPM's ARP cache does not include a hardware address associated with the host IP address. The residual affect of the GARP request is the updating of the host's ARP cache with the active unit's hardware address and the active IP address for the XPM node 16.

Figure 7:
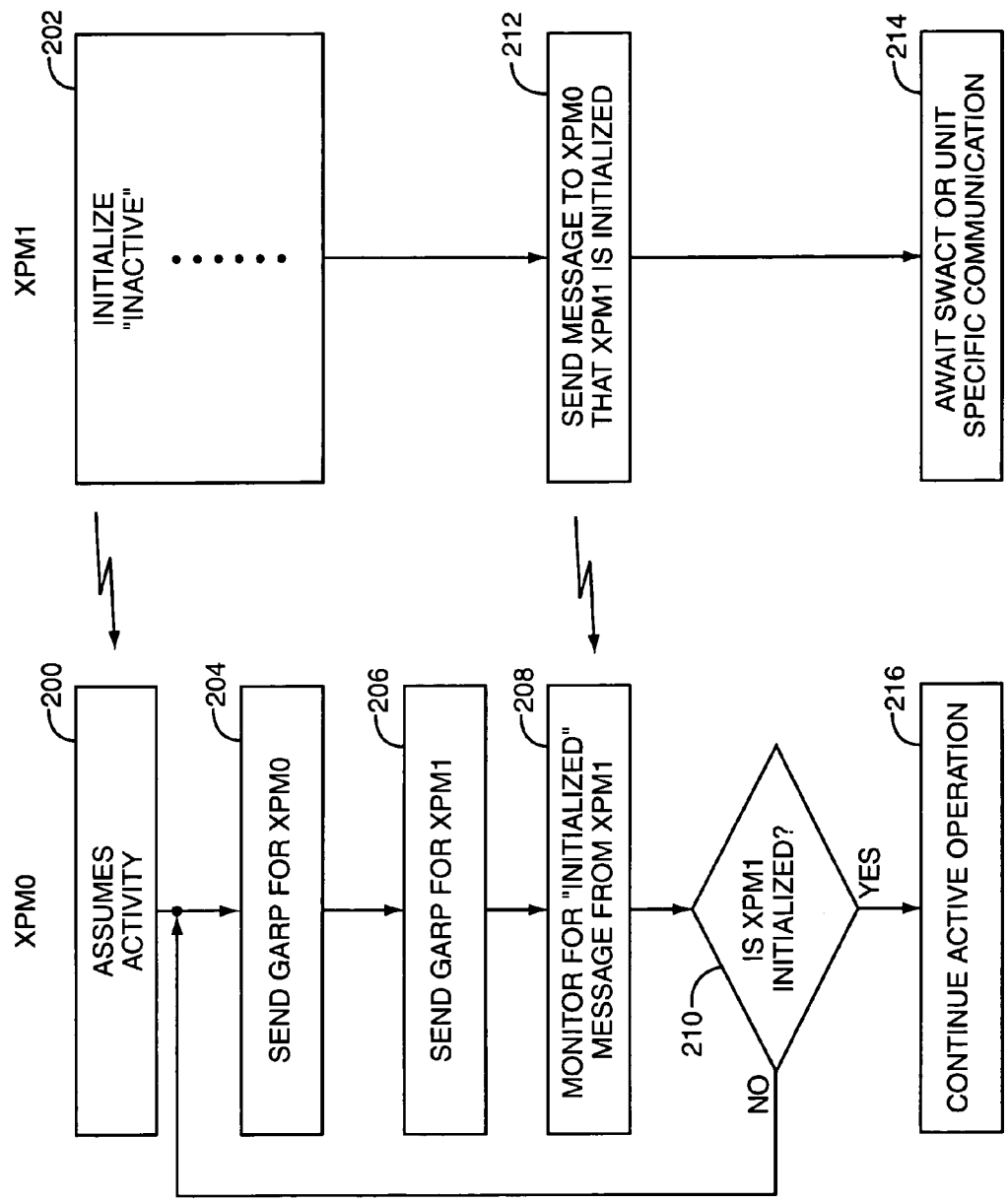
FIG. 7 is a flow chart outlining additional messaging according to the preferred embodiment of the present invention.

During initial startup, and preferably after each SWACT, the inactive XPM 24 reinitializes or reboots itself. During this rebooting process, it is preferable to have the active unit send out a GARP request identifying itself as the active unit as well as send out periodic GARP requests providing the hardware address associated with the IP address of the inactive unit. A preferred process is outlined in FIG. 7 wherein when XPM0 assumes activity (BLOCK 200) and XPM1 is reinitializing (BLOCK 202), the active XPM0 sends a GARP request identifying the active IP address and XPM0's hardware address (BLOCK 204). While XPM1 is reinitializing, XPM0 will preferably send periodic GARP requests on behalf of XPM1 identifying the hardware address for XPM1 and the inactive IP address (BLOCK 206). XPM0 may also periodically send out the GARP for itself during this period.

XPM0 will monitor for a message or signal from XPM1 indicating that it is completely initialized and operating in the inactive state (BLOCK 208). If XPM1 is not initialized (BLOCK 210), XPM1 will send out another GARP request for itself (BLOCK 204) and for XPM1 (BLOCK 206) and continue to monitor XPM1 (BLOCK 208). When XPM1 is fully initialized in the inactive state, it will send a signal or message to XPM0 that is indicative of its status (BLOCK 212). Once XPM0 receives this message or signal, it will stop sending GARP requests for XPM1 and continue active operation (BLOCK 216). Similarly, XPM1 will await a SWACT or other specific communication (BLOCK 214).

During the initialization of any XPM 24, an XPM 24 will preferably use a standard BOOTP process for rebooting. Typically, the BOOTP server will only provide one IP address for a given XPM 24. With the present invention, it is preferable to have a specific unit IP address determine the proper IP address based on the logical state of the XPM 24. As such, the BOOTP server will have a lookup table identifying the unit IP address for a specific XPM 24. The XPM 24 will be configured to recognize whether it is going to be initialized into an active or inactive state and derive the logical IP address, active or inactive, based on the defined addressing scheme. For example, the XPM 24 will determine the logical IP address based on whether it is active or inactive, preferably as a function of the static unit IP address.

The XPMs 24 in a given XPM node 16 will preferably have a direct, hardwired connection sufficient to allow one XPM 24 to determine the status or availability of the other. Preferably, when one unit fails, the complimentary unit can sense the failure and automatically become active without requiring external communication between the units. In the preferred embodiment, a timer task is used to exchange hardware addresses between the XPMs 24 in an XPM node 16. After initialization, the inactive XPM 24 may periodically send its hardware address to the active XPM 24. The active XPM 24 will respond with its own hardware address. Preferably, the last hardware address received is logged and time-stamped by the receiving XPM 24. If the inactive XPM 24 does not receive a hardware update from the active XPM 24 for a select period, then the active XPM 24 may assume the inactive XPM 24 has failed and will send GARP messages for the inactive unit until the hardware messages resume. The hardware address messages are useful to keep each XPM 24 up to date on the address and status of the other XPM 24 and enables the CPM 24 to send out the GARP on the mate's behalf.

With the above configuration, telephony modules may communicate with each other over IP networks without going through primary control systems, such as CM 14. Further, this configuration allows these modules to communicate outside of the traditionally restrictive bounds of proprietary networks. Modules may communicate over large distances in a uniform manner with like modules or other telephony hosts having access to the IP network. For example, if the telephony switching system 10 is a traffic operator position system (TOPS) used for directing directory assistance calls to operator terminals, open position protocol (OPP) messages can be sent to operator positions over the IP network anywhere in the country.

An additional benefit of the present invention provides ready access to IP networks by CM 14 via XPMs 24 and similarly situated devices. Preferably, a remote socket interface (RSI) is provided for the XPMs 24 and CM 14 so that applications running on the CM 14 can issue IP related calls and receive the same via the XPMs 24. The RSI interface running on the XPM 24 is preferably configured to automatically notify applications running on CM 14 of any incoming messages and established connections.

Although the preferred embodiments of the invention focus on telephony switching devices, including the digital multiplexing switches, the aspects of the present invention are equally applicable to media gateways and their corresponding gateway controllers, as will be recognized by those skilled in the art. In particular, the gateway would be configured to handle the TDM interface and operate in an analogous fashion to the XPMs 24 described above. Likewise, the gateway controller is analogous to the CM 14 in the sense that it provides processing and servicing functions to the multiple gateways controlled thereby. Those skilled in the art will recognize modifications and improvements within the concept described herein. These modifications and improvements are considered within the spirit of the disclosed invention and within the scope of the claims that follow.

What is claimed is:

1. A telephony node comprising first and second modules, each module comprising:
   a network interface; and
   a control system associated with the network interface and adapted to:
      operate in an active mode when the other module is inactive and in an inactive mode when the other module is active;
      communicate via the network interface using a first IP address when operating in the active mode; and
      communicate via the network interface using a second IP address when operating in the inactive mode,
   wherein one of the first and second modules operating in the active mode represents the telephony node and communicates as the telephony node using the first IP address; and
   wherein said control system for the first module is further adapted to broadcast a first gratuitous ARP request over a network intended to be received by at least one device upon switching from the inactive mode to the active mode, said first gratuitous ARP request containing the first IP address and a unique hardware address for said first module, and said control system for the second module is adapted to broadcast a second gratuitous ARP request over the network intended to be received by the at least one device upon switching from the inactive mode to the active mode, said second gratuitous ARP request containing the first IP address and a unique hardware address for said second module.

2. A telephony node comprising first and second modules, each module comprising:
   a network interface; and
   a control system associated with the network interface and adapted to:
      operate in an active mode when the other module is inactive and in an inactive mode when the other module is active;
      communicate via the network interface using a first IP address when operating in the active mode; and
      communicate via the network interface using a second IP address when operating in the inactive mode,
   wherein one of the first and second modules operating in the active mode represents the telephony node and communicates as the telephony node using the first IP address; and
   wherein said control system for the first module is further adapted to broadcast a first gratuitous ARP request over a network intended to be received by at least one device upon switching from the inactive mode to the active mode, said first gratuitous ARP request containing the second IP address and a unique hardware address for said second module and said control system for said second module is adapted to broadcast a second gratuitous ARP request over the network intended to be received by the at least one device upon switching from the inactive mode to the active mode, said second gratuitous ARP request containing the second IP address and a unique hardware address for said first module.

3. A method of providing a node using redundant modules comprising:
operating a first module in an active mode when a second module is inactive and in an inactive mode when the second module is active;
communicating using a first IP address with an active one of the first and second modules over a network; and
communicating using a second IP address with an inactive one of the first and second modules over the network, wherein one of the first and second modules operating in the active mode may represent the node and communicates as the node using the first IP address; and
broadcasting a gratuitous ARP request over the network intended to be received by at least one device on the network upon switching from the inactive mode to the active mode, said gratuitous ARP request containing the first IP address and a unique hardware address for an active one of the first and second modules.

4. A method of providing a node using redundant modules comprising:
operating a first module in an active mode when a second module is inactive and in an inactive mode when the second module is active;
communicating using a first IP address with an active one of the first and second modules over a network; and
communicating using a second IP address with an inactive one of the first and second modules over the network, wherein one of the first and second modules operating in the active mode may represent the node and communicates as the node using the first IP address; and
broadcasting a gratuitous ARP request over the network intended to be received by at least one device upon switching from the inactive mode to the active mode, said gratuitous ARP request containing the second IP address and a unique hardware address for the inactive one of the first and second modules.

5. A telephony node comprising:
a first telephony module having a first internet protocol (IP) address;
a second telephony module having a second IP address; and
a network interface; and
a control system associated with the network interface and adapted to:
designate one of the first and second telephony modules as active and concurrently designate the other of the first and second telephony modules as inactive;
assign an active IP address to the first telephony module when the first telephony module is designated active and concurrently assign the second telephony module an inactive IP address when the second telephony module is designated inactive; and
assign the active IP address to the second telephony module when the second telephony module is designated active and concurrently assign the first telephony module the inactive IP address when the first telephony module is designated inactive,
wherein the first, second, active, and inactive IP addresses are distinct from one another.

6. The telephony node of claim 5 wherein the first and second telephony modules are each associated with a unique hardware address.

7. The telephony node of claim 6, wherein the active IP address is selectively associated with the corresponding unique hardware address based on which module is designated active.

8. The telephony node of claim 6, wherein the inactive IP address is selectively associated with the corresponding unique hardware address based on which module is designated inactive.

9. The telephony node of claim 5, wherein first and second telephony modules are adapted to broadcast gratuitous ARP requests.

10. A telephony module comprising:
a network interface; and
a control system associated with the network interface and adapted to:
associate a first internet protocol (IP) address with the telephony module;
receive instructions from a computation module to associate an active IP address with the telephony module when the telephony module is in an active state; and
receive instructions from the computation module to associate an inactive IP address with the telephony module when the telephony module is in an inactive state,
wherein the first, active, and inactive IP addresses are distinct from one another such that:
messages sent to the first IP address are received by the telephony module independent of a state in which the telephony module is,
messages sent to the active IP address are received by the telephony module only when the telephony module is in the active state, and
messages sent to the inactive IP address are received by the telephony module only when the telephony module is in the inactive state.

11. The telephony module of claim 10 wherein the telephony module is associated with a unique hardware address.

12. The telephony module of claim 11 wherein the control system associates the active IP address with the unique hardware address when the telephony module is in the active state.

13. The telephony module of claim 11 wherein the control system associates the inactive IP address with the unique hardware address when the telephony module is in the inactive state.

14. The telephony module of claim 10 wherein the control system is adapted to broadcast a packet to at least one device upon switching from the inactive state to the active state.

15. The telephony module of claim 10 wherein the control system is adapted to broadcast a gratuitous ARP request over a network to be received by at least one device upon switching from the inactive state to the active state.

16. The telephony module of claim 10 further comprising a telephony interface for handling circuit-switched traffic and a computation module interface to communicate with the computation module.

17. The telephony module of claim 16, wherein said control system is further adapted to establish a remote socket interface with the computation module via the computation module interface.

18. The telephony module of claim 10 further comprising a telephony interface for handling circuit-switched traffic and a computation module interface for communication with the computation module to form a peripheral module for a digital switch, the telephony module and the computation module cooperating to provide call processing.

19. The telephony module of claim 10 wherein said control system is further adapted to control a media gateway as part of a media gateway controller.

20. A method of using a telephony node comprising:

assigning a first telephony module a first internet protocol (IP) address;

assigning a second telephony module a second IP address;

designating one of the first and second telephony modules as active and concurrently designating the other of the first and second telephony modules as inactive;

assigning an active IP address to the first telephony module when the first telephony module is designated active and concurrently assigning the second telephony module an inactive IP address when the second telephony module is designated inactive; and assigning the active IP address to the second telephony module when the second telephony module is designated active and concurrently assigning the first telephony module the inactive IP address when the first telephony module is designated inactive.

21. A method of using a telephony module comprising:

associating a first internet protocol (IP) address with the telephony module;

receiving instructions from a computation module to associate an active IP address with the telephony module when the telephony module is in an active state; and receiving instructions from the computation module to associate an inactive IP address with the telephony module when the telephony module is in an inactive state, wherein the first, active, and inactive IP addresses are distinct from one another such that:

messages sent to the first IP address are received by the telephony module independent of a state in which the telephony module is, messages sent to the active IP address are received by the telephony module only when the telephony module is in the active state, and messages sent to the inactive IP address are received by the telephony module only when the telephony module is in the inactive state.

\* \* \* \* \*